Dec. 24, 1929.  H. J. MURRAY  1,740,777
AUTOMOBILE SIGNALING DEVICE
Filed Aug. 6, 1925  2 Sheets-Sheet 1

INVENTOR
Howard J. Murray
BY
Warren S. Orton.
ATTORNEY

Dec. 24, 1929.  H. J. MURRAY  1,740,777
AUTOMOBILE SIGNALING DEVICE
Filed Aug. 6, 1925  2 Sheets-Sheet 2
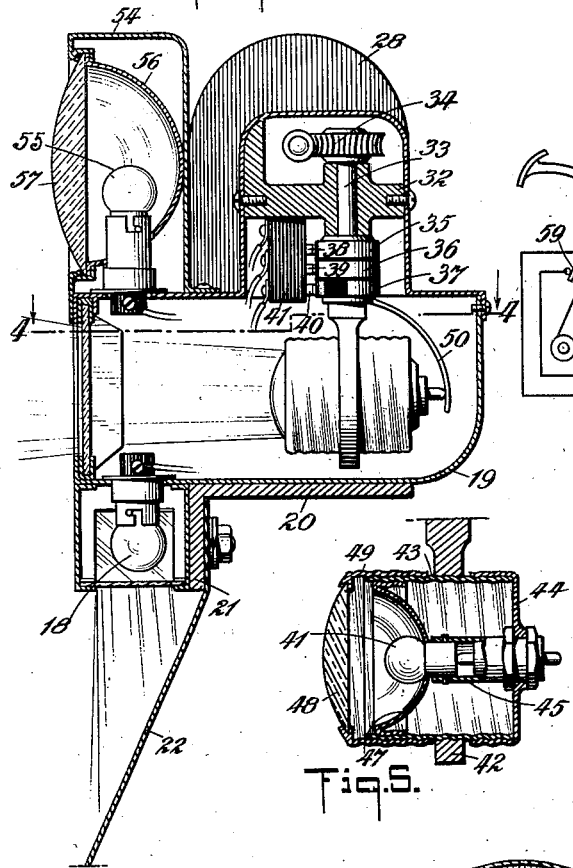
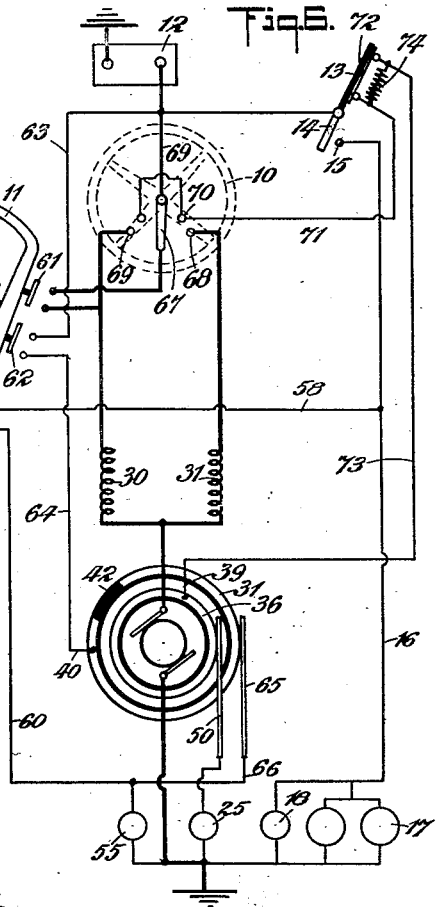
INVENTOR
Howard J. Murray
BY
Warren S. Orton
ATTORNEY Patented Dec. 24, 1929

1,740,777

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

AUTOMOBILE SIGNALING DEVICE

Application filed August 6, 1925. Serial No. 48,560.

The invention relates to a signaling device of general application wherever such a device can be used and the embodiment of the invention selected for specific discussion herein is particularly designed for installation as the rear or front signaling device on an automotive vehicle.

The primary object of the invention is to provide a simplified form of signaling device which will function more efficiently than similar devices now in general use and which can be readily installed on an automotive vehicle and conveniently coupled to work in unison with the vehicle control element so that the several desired signals may be given automatically as an incident of the operation of the vehicle and without intentional volition on the part of the operator, except in those cases where he desires to give a preindication of an intended change in direction of the movement of the vehicle.

Another object of the invention is to provide a signaling device for automotive vehicles by means of which the different warning signals will be in the form of flashing or moving lights peculiarly actuated to constitute notice impelling devices for quickly attracting the attention of the person intended to be warned by the functioning signal.

Light signals of the class indicated must function sometime in a strong sunlight and therefore such light must be of such intensity and moving at such rate as will function properly under the adverse conditions of seeing the same in bright daylight. On the contrary it has been found that at night or under cloudy or dark external weather conditions, a bright signaling light is not as effective as a dimmer or smaller light.

Accordingly, another object of the invention is to provide a form of signaling device which will take advantage of these psychological conditions and incidentally to provide a moving direction signaling light which can be controlled by the usual manipulation of the lighting switch so that when the signal control is actuated the signal will function in the manner best suited to the surrounding light or dark conditions of the environments.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings:—

Figure 3 is a vertical transverse sectional view taken on the line 3—3 of Figures 1 and 2 looking in the direction indicated by the arrows;

Figure 4 is a horizontal transverse sectional view taken through the casing and looking down from the plane indicated by the line 4—4 of Figure 3;

Figure 5 is a vertical sectional view taken through the direction indicator light and taken on the line 5—5 of Figure 4; and Figure 6 is a diagrammatic view of the parts shown in the preceding figures together with some of the vehicle controlling elements and with the necessary electrical connection to form the several circuits hereinafter described.

Figures 1, 2:
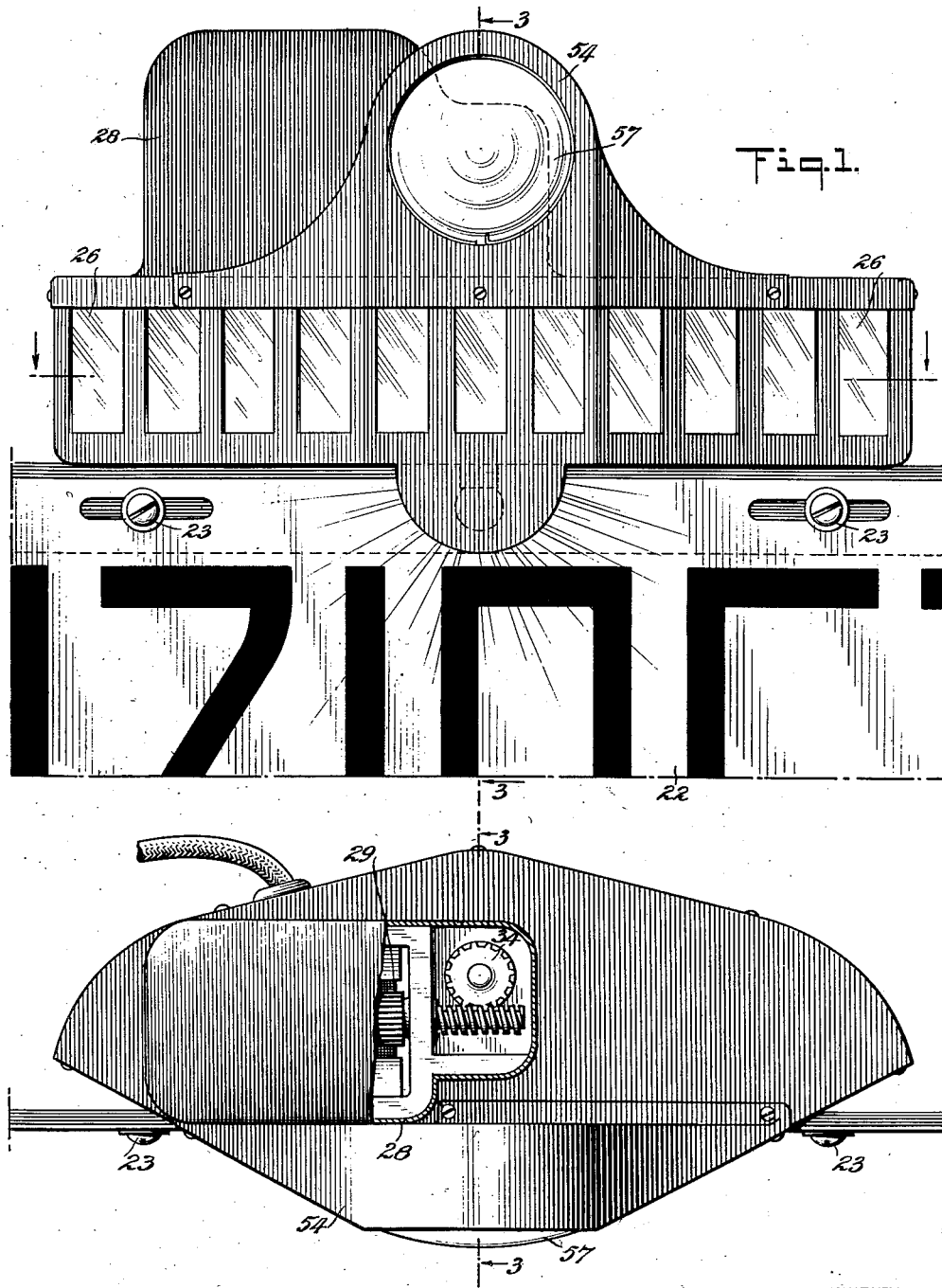
Figure 1 is a view in rear elevation of a lamp housing constituting a preferred embodiment of the invention and showing attached thereto a portion of a license plate.
Figure 2 is a plan view looking down upon the showing in Figure 1 and with part of the motor casing broken away to show internal construction.

In the following description and in the claims, parts will be identified by specific names for convenience of expression but they are intended to be as generic in their application to similar parts as the art will permit.

In the drawings and first referring to certain conventional vehicle control elements with which the device herein featured is intended to cooperate, there is shown in dotted outlines in Figure 6 the vehicle steering wheel 10, the foot control service brake 11, the battery or other source of electric energy 12 and the lighting switch 13. Still following conventional practice it is understood that the manually actuated lever 14 of the lighting switch 13 in its operative or lighting position makes contact with fixed contact point 15 which is connected by means of conductor 16 with the head and other lights 17 and with the license plate light 18, all of which lights are collectively referred to hereinafter as the car lights, forming part of the usual car lighting system.

The present disclosure features the combining in a single marketable unit of all the necessary signal lights and control mechanisms therefor and which unit may also be used to support the license plate.

The structural unit illustrated is designed to take the place of both the tail and direction indicating rear lamp now in general use and comprises essentially a wide, flat, hollow casing 19 formed of sheet metal and supported on a rugged angle bracket 20. Secured to the vehicle a front depending flange 21 of this bracket provides a support for the upper edge of a downwardly and forwardly inclined license plate 22 demountably secured thereto by means of bolts 23.

The front side of the casing 19 is designed to provide a horizontally extending line of spaced apart light apertures 24, each covered by a pane of glass or other light transmitting covering preferably red glass lens. These aperture coverings are designed to be illuminated by a swinging beam of light originating in a source of light 25 positioned in a casing in the rear of the line of light apertures and functioning as will hereinafter be more fully described.

Referring to the showing in Figure 4 it is noted that the vertically disposed front of the casing 19 defined by the line of apertures is flat at its central portion with each side portion retreating from the adjacent edge of the central portion rearwardly from the vertically disposed plane containing the central portion. This particular arrangement provides for a neat, artistically appearing front to the casing and has the additional advantage in that such a front, or a similar curved front, increases the arc of movement of the light beam over a greater area than would be provided by the same size flat face to the casing.

Adjacent apertures are separated by vertically disposed and radially extending partitions 27 which have the effect of preventing the light which is directed on to or through one of the glasses 26 from shining into the next adjacent glass. These partitions assist in confining the illuminated area to that particular aperture through which the light beam, at the time being, is directed and thus prevents a glow from appearing in any other of the apertures.

Positioned on top of the casing 19 is a motor casing 28 in which is contained a reversible electric motor 29 provided with two reversibly wound field windings 30 and 31, indicated symbolically in Figure 6. Positioned in the motor housing and journalled in the frame 32 of the motor is a vertically disposed shaft 33 geared to the armature shaft of the motor by a worm drive 34. The shaft 33 is provided adjacent its lower end with three commutator rings 35, 36 and 37 operatively connected with their associated brushes 38, 39 and 40, the latter carried by an insulating connection block 41, depending from the motor frame 32. The commutator 35 and its associated brush 38 in the illustrated showing, has no function and may be regarded as a reserve connection for supplying current to an alarm or some other circuit forming no part of the present disclosure.

The ring 37 contains an insulating insert 42 and this ring together with its associated brush 40 constitutes an interrupter for intercepting current flow to a flash stop light hereinafter described.

The lower end of the shaft 33 is secured to a lamp supporting ring 42 (see Figure 5) depending therefrom and extending into the casing 19 for carrying the source of direction indicating light 25. Structurally this light source includes an open end cylindrical threaded housing 43, a rear closing cap 44 which supports a lamp socket 45 for carrying a small lamp 46. This signal lamp is centered within a parabolic reflector 47 threaded into the forward end of the casing 43. The lamp is arranged to project its light through a focusing lens 48 carried by a sleeve 49 in external threaded engagement with the casing 43. Electric contact is made between the lamp 46 and the commutator ring 36 by means of a spring contact finger 50 revolving with the same. Opposite vertical sides of the lens 46 is painted black as indicated at 51 and 52 (Figure 4) so as to leave a narrow vertically disposed light transmitting slit 53 across the optic axis of the lens.

It will be understood from this construction that energizing the motor will cause it to rotate selectively in one of its rotary directions depending on the direction of throw of the control switch hereinafter described, and that such rotary motion is transmitted to the shaft 33. This shaft in rotating the source of light 25 will cause a thin vertically disposed light beam to pass successively across each of the glass coverings 26 from one to the other end of the line of apertures in a direction depending upon the direction of turning of the reversible motor.

Positioned above the casing 19 and preferably at the center thereof and in advance of the motor housing is a tail light housing 54 in which is positioned a combined tail and flash "stop" light 55. This housing is provided with a reflector 56 back of the light and with a lens 57 in advance of the light following conventional practices in this respect.

It is intended that under normal conditions of night driving the light 55 functions continuously as a tail light, and that it be controlled by the usual lighting switch 13 as is usual. For this purpose the light 55 is included in a circuit which traced from the source of energy 12 through the switch element 14, the fixed contact point 15, conductor 16, forming the car light circuit and then through a shunt circuit including conductor 58 branched from conductor 16, through a normally closed circuit maker 59 and conductor 60 through lamp 55 to ground.

The circuit maker 59 is fixed to and controlled by the service brake 11 and is so disposed that when the service brake is in its normal, inoperative and non-breaking position the circuit thus described is completed and the activity of the tail light is controlled solely by the disposition of the lighting switch 13 as is usual with present constructions.

In addition to its functioning as the usual tail light it is intended that the light 55 also function as a "stop" light or "slow" light, and by flashing rapidly indicates to the driver of a following car, or to a person in advance of the car when the construction is also positioned so as to be visible from the front of the car, that the vehicle is about to stop or slow down in its speed. For this purpose the lamp is caused to flash as an incident of the movement of the brake away from its normal inoperative position into or towards its operative breaking position. For this purpose the brake 11 is provided on the side opposite the circuit maker 59 with two circuit closers 61 and 62 normally in circuit breaking position as indicated in Figure 6. The circuit closer 61 is disposed on the brake so that a movement thereof towards its breaking position would shift the circuit closer 61 into position to close the circuit through the field winding 30 of the motor, and thus cause it to rotate in one direction, the direction of movement in this case being immaterial for it is intended simply to cause the interrupter to function. In this way the circuit closer 62 completes the circuit through the interrupter to the light 55.

Referring to Figure 6 it is noted that the current supplied from the source 12 is conveyed through branch conductor 63, circuit closer 62, conductor 64, brush 40, ring 37, brush 65, conductor 66, through lamp 55 to ground.

It will be understood from this construction that the periodic passing of the insulating block 42 across the brushes 40 and 65 incidental to the rotation of the motor drum shaft 23 will cause two interruptions to the current flow for each rotation of the shaft 33. It is required that the stop light flashes be more rapid than the swinging of the direction indicating light but the two break connection thus described permits the use of the same shaft for driving the communicators and revolving the direction light beam. Obviously additional insulating inserts may be placed in the ring 37.

From this construction it will be seen that the act of displacing the brake from its normal position will automatically cause the motor to rotate the interrupter and this in turn will cause the lights to flash rapidly. Restoring the brake to its normal position will break both the motor circuit and the circuit containing the interrupter, and at the same time, will restore the light 55 to its active position functioning as a tail light, provided of course the lighting switch 13 is in its "on" position.

The direction indicating light 25 will normally be extinguished and not rotating during the usual forward driving of the vehicle. The light will become active and will rotate selectively in the direction in which the vehicle is turning or is about to turn by a control manipulated by the operator. This control may be simply a two positioned manually actuated switch mounted in some position convenient to the operator, or it may be a switch controlled automatically by the movement of the steering wheel 10 or some other part of the steering mechanism as is disclosed in certain patented structures. Such a switch is indicated symbolically by the pivoted arm 67 (Figure 6). This arm in its movement in one direction such as a movement to the operator's right makes contact with switch point 68 constituting a terminal of one of the motor field windings and in this way circuit is closed from the source 12, through branch conductor 69, the right field winding 31 to ground. Similarly a movement of the arm 67 to the left will make contact with point 69 forming a terminal of the left field winding 30, and the circuit will be completed through the motor to ground. The field windings are so arranged that the movement of the switch either manually or automatically to preindicate or indicate a movement of the vehicle to the right will cause the light 25 to sweep past the light aperture 24 from left to right and thus indicate that the vehicle is about to turn or is turning to the right. Similarly a movement of the control switch to the left will cause the light beam to sweep from right to left and thus indicate a movement of the vehicle or an intended movement of the vehicle to the left.

This same movement of the switch arm 67 to either the right or left simultaneously closes the light circuit to illuminate the lamp 41 irrespective of the position of the lighting switch 13. Assuming the switch to be in its "off" position, shown in Figure 6, current supply can be traced from the source 12, through switch arm 67, contact point 70, conductor 71, through a bridging plate 72 carried by the switch 13 through conductor 73, brush 39, commutator ring 36, brush 50, through light 25 to ground. Under these conditions it is seen that during the day time or when the switch 13 is in its "off" position the full strength of current from the source 12 is sent through the lamp 46 forming the light source 25 and the light beam directed through the apertures 24 is relatively bright. While this bright light beam is desired so that the signals may be readily seen in the bright sunlight, such a signaling light is too intense at night time. A relatively dim light functions much better under such conditions. Accordingly, the present disclosure features the inclusion in the light circuit supplying the direction indicator light of a resistance 74 biasing the switch 13 so that when the switch is in its "on' position and with the bridging plate 72 removed, the current flow is traced from the conductor 71, through the high resistance 74, and then through the conductor 73 as previously outlined.

From this construction it will be seen that the lighting switch automatically controls the intensity of brightness of the beam which constitutes the direction indicating signal.

By means of the device disclosed it is possible to provide a highly efficient signaling system which may be entirely automatic in its operation and may be utilized without necessity of providing any control in addition to the vehicle control element already present on the vehicle. The operator in making a turn to the right or left automatically causes the direction indicator to properly indicate the direction of turn and at the same time the attention of the person warned is attracted by the sudden appearance of a moving light even though the person may not be looking at the signaling device. Similarly the act of braking the movement of the car in slowing to a stop will similarly warn persons in the line of vision of the stop light that the operator has applied his brakes for some reason.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a device for selectively indicating one of two oppositely disposed directions, the combination of a projector having on one side a plurality of light screens disposed substantially equidistant apart and relatively close together in a straight line parallel to the direction to be indicated, a single source of light for illuminating said screens, one at a time, and means acting on the light from said source for causing the same to rotate about a fixed axis and illuminate said screens successively and rapidly from one end of the line to the other, and thus cause in effect a spot of light to move in the straight line.

2. A direction indicating signal device including a projector having on one side a plurality of light screens disposed in line parallel to the direction to be indicated, a source of light mounted for rotary movement about a fixed axis to cause a beam of light to move in a plane passing through said screens and adapted in its rotary movement to illuminate said screens one at a time, a reversible motor acting on said light source to rotate the same selectively in either direction.

3. In a device of the class described, the combination with a projector provided with a plurality of windows disposed in a straight line to form a direction indicator, of a reversible motor, a revolving light disposed to swing a beam of light across and thus illuminate said windows, and said motor operatively connected to the light to revolve the same and thus swing the light beam in either direction past said windows.

4. In a signal device, a projector including a housing provided on one side with a plurality of light apertures arranged in spaced apart relation in a horizontal line, a source of light within the housing and mounted for rotary movement about a vertical axis to swing a beam of light successively through said light in a horizontal plane, apertures from one end to the other of said line, or reverse, and a reversible motor for turning said light source selectively in either direction.

5. In a signal device, a projector including a housing provided on one side with a plurality of light apertures arranged in spaced apart relation in a straight line and coacting to form a direction indicating device, light transmitting coverings for each of said apertures, a source of light within the housing and mounted for rotary movement to swing a beam of light about a fixed axis successively through said light apertures from one end to the other of said line, or reverse, and a reversible motor for turning said light source in either direction.

6. In a signal device, the combination of a lamp including a projector housing provided with a plurality of light apertures each containing a light transmitting cover, a source of light within the housing, said light source including means for swinging the light beam therefrom successively on to the covers of said light aperture, and a fixed partition disposed between each adjacent aperture to prevent the light beam while directed on to one of the covers from illuminating the next adjacent cover.

7. In a device of the class described, the combination of a projector including a source of light mounted for rotary movement, and adapted to form a light beam, a plurality of light transmitting bodies spaced apart in line in the direction of movement of the light beam from said source coacting to form a direction indicator and adapted to be illuminated successively from one to the other end of said line, and radially extending partitions between adjacent bodies thereby to confine the light to the body towards which the beam for the time being is directed.

8. In a direction indicator, the combination of a plurality of pieces of translucent glass disposed in spaced apart relation and in a horizontal line to form a direction indicator, means for forming a beam of light, and control means operatively connected to the last named means for causing the light beam to swing in the plane of said line of pieces of glass and thus shine in succession through said glass pieces, one after the other, from one to the other end of the line.

9. In a direction indicating device, the combination of a casing, means therein for causing a beam of light to rotate about a contained axis and in a fixed plane, said casing provided with a line of light apertures in said plane and disposed to have the light beam shine thereon successively from end to end as the beam is rotated to simulate a spot of light travelling in the direction of the rotating beam, and the portion of the casing in said plane and beyond opposite ends of said line of apertures being opaque to intercept the light beam during its rotary movement and until it is again visible through the light apertures.

10. In a signal device, the combination of means for forming a beam of light, mechanism for rotating said means, a direction indicator including a line of light transmitting bodies disposed in a portion of the path of movement of said light beam, opaque means for screening the beam of light as it passes over the remainder of its path, and said first named means provided with adjustable means for focusing the light beam relative to said bodies to cause the beam to pass through said bodies without any substantial spreading from its beam form.

Signed at New York in the county of New York and State of New York this 5th day of August A. D. 1925.

HOWARD J. MURRAY.